United States Patent
Kling

(10) Patent No.: US 7,441,927 B1
(45) Date of Patent: Oct. 28, 2008

(54) LAMP WITH A LENS LENTICULE PATTERN BASED ON THE GOLDEN RATIO

(75) Inventor: Michael R Kling, Lexington, KY (US)

(73) Assignee: Osram Sylvania Inc., Danvers, MA (US)

( * ) Notice: Subject to any disclaimer, the term of this patent is extended or adjusted under 35 U.S.C. 154(b) by 13 days.

(21) Appl. No.: 11/825,016

(22) Filed: Jul. 2, 2007

(51) Int. Cl.
*F21V 7/00* (2006.01)

(52) U.S. Cl. .................. 362/297; 362/309; 362/346
(58) Field of Classification Search .............. 362/297, 362/309, 329, 346; 313/111, 113, 116
See application file for complete search history.

(56) References Cited

U.S. PATENT DOCUMENTS

| | | | | |
|---|---|---|---|---|
| 5,199,787 | A | * | 4/1993 | King et al. .................. 362/310 |
| 5,272,408 | A | * | 12/1993 | Levin et al. .................. 313/113 |
| 5,683,175 | A | * | 11/1997 | Golz .......................... 362/338 |
| 6,086,227 | A | * | 7/2000 | O'Connell et al. .......... 362/297 |

* cited by examiner

*Primary Examiner*—Thomas M Sember
(74) *Attorney, Agent, or Firm*—William E. Meyer

(57) ABSTRACT

A lens with lenticules arranged in a spiral pattern is described. In polar coordinates the centers of successive lenticules are radially and angularly spaced by spacing factors including Phi, the conjugate of the Golden Ratio. The resulting spiraling lenticule pattern is free of internal harmonics that lead to striation patterns in the lens refracted light. At the same time the size of the beam spot can be set by reflector size and lenticule profile.

4 Claims, 4 Drawing Sheets

LAMP WITH A LENS LENTICULE PATTERN BASED ON THE GOLDEN RATIO

CROSS-REFERENCE TO RELATED APPLICATIONS

Not applicable

BACKGROUND OF THE INVENTION

1. Field of the Invention

The invention relates to electric lamps and particularly to electric lamps. More particularly the invention is concerned with a PAR lamp with a lens having a pattern of refractive lenticules.

2. Description of the Related Art Including Information Disclosed Under 37 CFR 1.97 and 1.98

Reflector lamps provide controlled beam patterns with light distributions with beam spreads ranging from a narrow spot with a beam angle of 10 degrees or less to a wide flood with a beam angle greater than 45 degrees. Most applications for screw based lamps require a smooth beam with circular symmetry that is free of light and dark bands or striations. This is especially true for retail lighting where the customer can be very concerned with beam quality. Most of the useful light from a reflector lamp is within the beam angle defined as the total angular spread of a cone of light to 50 percent of maximum intensity. Although the shape and uniformity of the central beam are important, the uniformity of light outside the central beam can also be critical to illumination quality. Light striations in the outer region can be easily detected by the human eye and distracting.

Typical reflector lamps use a parabolic reflector to collimate the light and then a lens with a pattern of optical elements or lenticules to spread the beam to the desired shape. Alternately, a random stipple pattern on the lens inner surface can be used to provide a small spread angle suitable for the relatively narrow beam of a spot lamp. A problem with the most common lens lenticule patterns is that the beam is distorted from the desired circular shape and the regular lenticular pattern causes an objectionable pattern of light and dark bands in the illuminated region outside the central beam. U.S. Pat. No. 6,086,227 describes the problems with most typical reflector lamp optics and proposes a spiral lenticule optic pattern that substantially reduces the non-uniformity and beam striations in most cases.

FIG. 1 shows a prior art end view of a PAR lamp lens with a spiral lenticule pattern. The spiral pattern of the U.S. Pat. No. 6,086,227 design has been found to still have an underlying hexagonal symmetry that slightly distorts the desired circular beam shape. This hexagonal symmetry is especially noticeable in smaller spot size lamps such as a PAR20 using fewer lenticules. The hexagonal symmetry of the spiral pattern also contributes some striations that are typically not objectionable in flood lamps with beam angles wider than 25°.

The striations created by the spiral pattern are more obvious with narrow beam angles. The lens with spiral lenticule pattern scatters less light outside the central cone, but does project an unacceptable pattern of light and dark streaks. These striations can be more pronounced than those produced by hexagonal close packed lenticules. For this reason, most PAR lamps with beam angles less than 15 degrees use a random stippling on the lens inner surface to create desired spread. The stippled lenses have a relatively smooth circular beam with minimal striations.

Although stippled lenses provide acceptable performance, lenticules offer several advantages over lens stippling. For assured quality control of the beam, manufacturers prefer, if possible, to use defined lens optics in lamps with spread beams. The stippling on the glass pressing tool is usually created by one of these processes—acid etching, electrical discharge machining (EDM), or shot blasting. All these processes have inherent variations that are difficult to control, leading to wide beam angle tolerances. The stippled tooling also wears faster than machined lenticule tooling increasing costs. Most significantly, the machined lenticules offer greater control of beam spread than does a random stipple pattern, so more light can be directed into the useful beam with less light scattered outside the useful beam. Test results have confirmed that spot lenses using lenticule optics have 5 to 10 percent higher center beam candlepower than stippled lenses of equal beam angle providing a substantial performance improvement.

Effective lenticule patterns must have uniform lenticule spacing over the face of the lens to avoid deviation from circular beam shape and to maximize luminous flux within the beam angle. But any regular pattern should be avoided to minimize striations and beam distortion. A random lenticule pattern results in a wide distribution of lenticule spacing causing poor beam lumens. All known lenticule lens patterns used on PAR lamps have some regular pattern or rotational symmetry that adversely affects the light distribution. Lenticules are typically arranged in a hexagonal or square pattern.

BRIEF SUMMARY OF THE INVENTION

A lamp lens may be formed with a light transmissive plate having a plurality of light refractive lenticules formed on a surface of the lens. The plate has a center around which the lenticules are positioned and may be sequentially counted such that the polar coordinates ($R_n$, $\theta_n$) of the n'th lenticule are defined by the relations: $R_n = s * \phi * \sqrt{n}$ (where $R_n$ is the radial distance from the lens center or lamp axis to the n'th lenticule's center); and $\theta_n = n * \phi * 2 * \pi$ (where $\theta_n$ is the angular rotation in radians around the plate center from a chosen position). n is the number of the n'th successive lenticule. s is the radial spacing parameter. $\phi$ is $2/(1+\sqrt{5}) = 0.618033989\ldots$, known as phi, also known as the conjugate of the golden ratio $\Phi$, that is $\Phi - 1$.

DETAILED DESCRIPTION OF THE INVENTION

Figure 1:
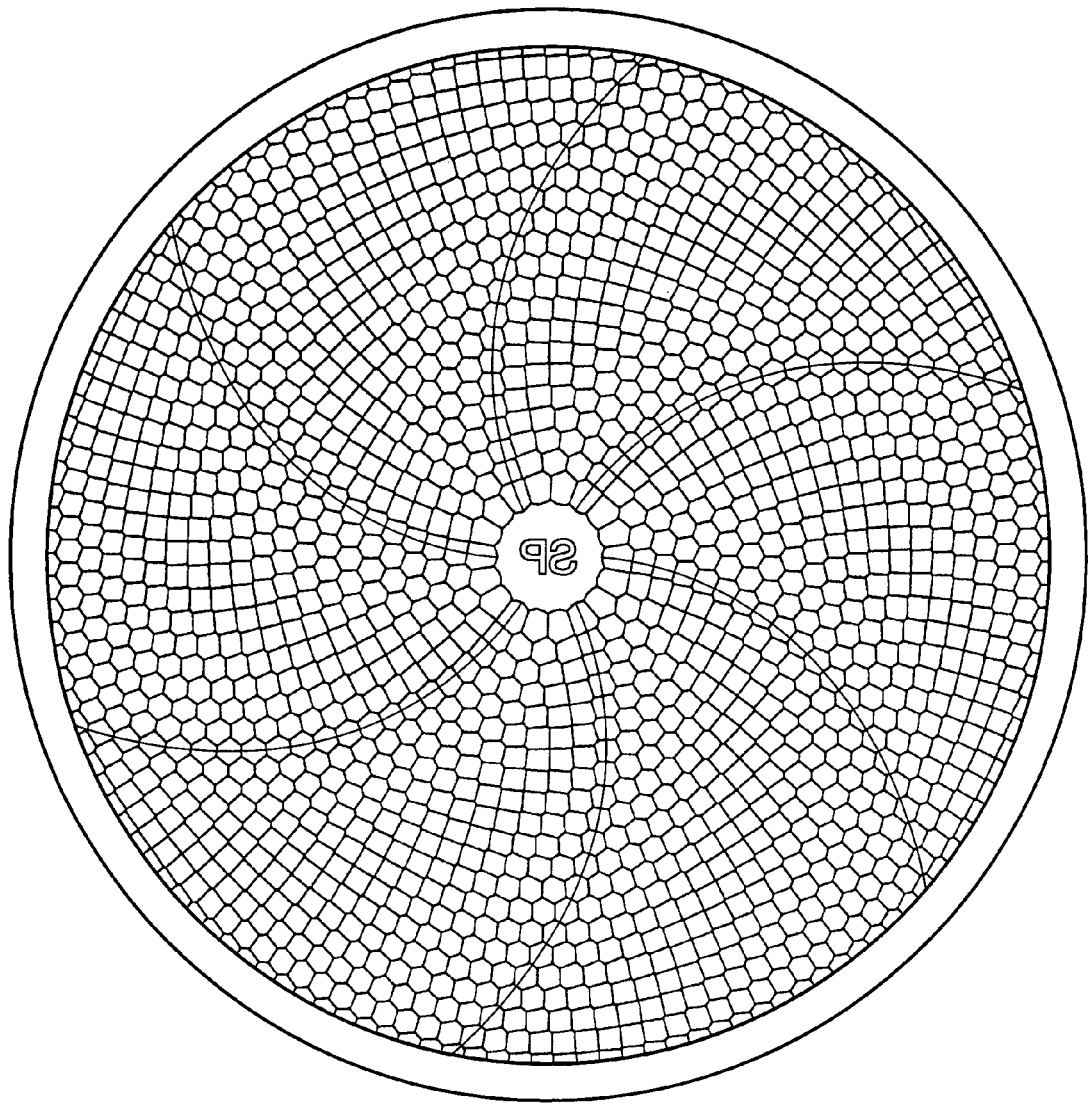
FIG. 1 shows a prior art end view of a PAR lamp lens with a spiral lenticule pattern.
Figure 2:
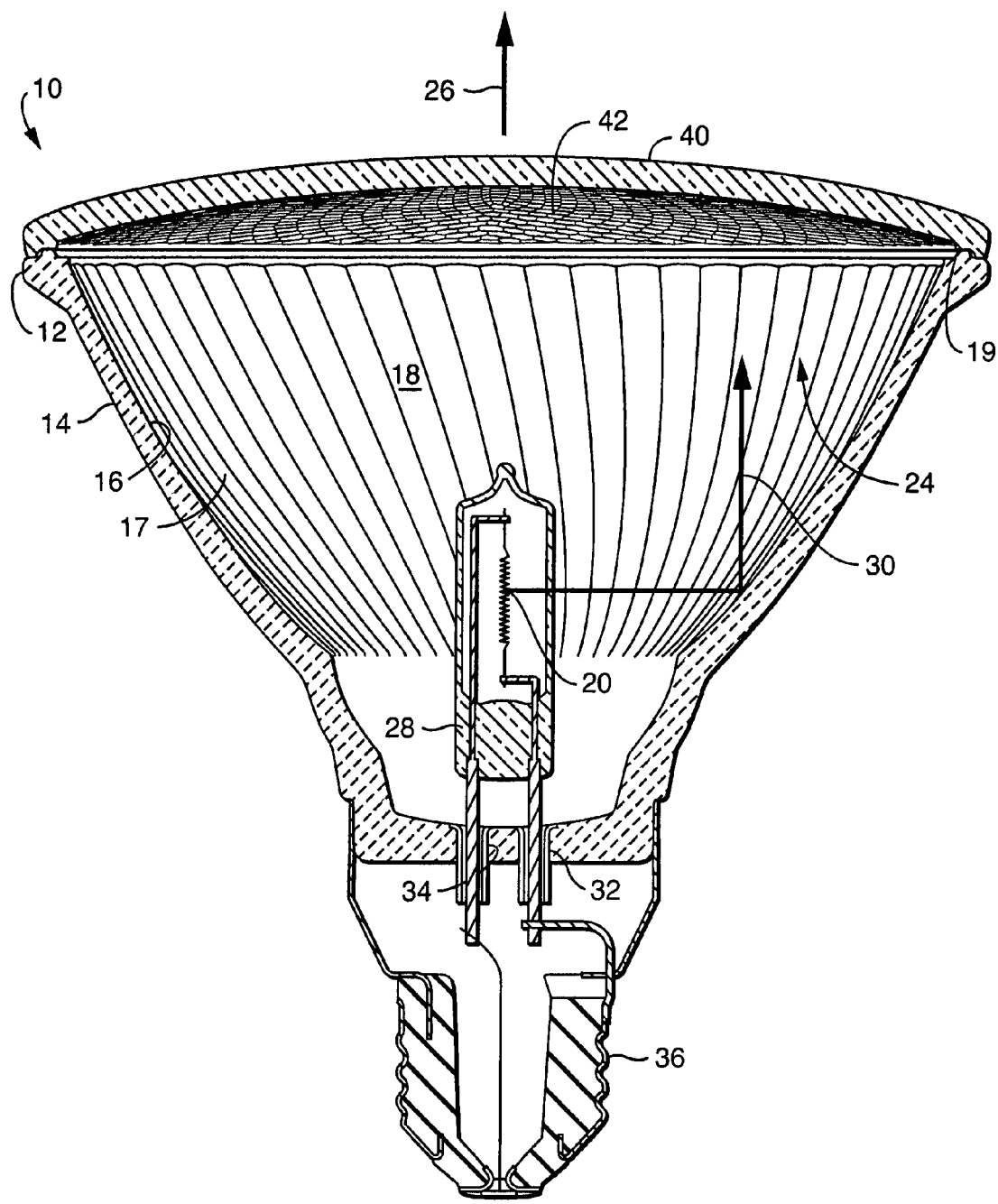
FIG. 2 shows a cross sectional view of a preferred embodiment of a PAR lamp with a lens lenticule pattern based on the golden ratio.

FIG. 2 shows a cross sectional view of a preferred embodiment of a PAR lamp 10 with a lens lenticule pattern based on the golden ratio. The preferred PAR lamp 10 comprises a reflector 12 with wall 14 having a reflective surface 16, preferably with spiral facets 17 facing a defined interior volume 18. The preferred reflective surface 16 is a parabolic body of revolution having an axially located focal point 20. The reflector 12 includes one or more electrical connection passages 32, 34 and a forward opening 24 facing along an axis 26 a field to be illuminated. The reflector 12 may be made out of molded glass, metal or plastic to have the general form of a cup or hollow shell. Formed on the reflective surface 16, are a plurality of facets 17. The facets 17 may be formed to extend radially. In the preferred embodiment, the facets 17 at least partially spiral around the lamp axis 26. The reflector cavity 18 has at its forward end a rim 19 defining an opening 24 for the passage of light to the exterior. The preferred forward opening 24 has a circular form. The reflector 16 may also include a rearward facing neck or similar stem or other support or connection features for electrical and mechanical connection and support.

Enclosed in the interior volume 18 is an electric light source 28, such as a tungsten halogen lamp capsule positioned to emit light towards the reflective surface 16. The light source may be a tungsten halogen, arc discharge burner, or an LED, but any compact electric light source is acceptable. The preferred light source has the general form of a single ended press sealed tungsten halogen bulb. The preferred light source has an axis about which the reflector surface 16 is roughly symmetric. Double ended and other forms may be used. The preferred light source 28 is located to overlap the focal point 20 so that emitted light is reflected, at least initially, substantially as a collimated axial beam 30. The electric light source 28 is electrically coupled through and or supported in the connection passage(s) 32, 34 to a base 36 for electrical and mechanical coupling in a socket. A threaded base is commonly used for the electrical and mechanical coupling. The forward opening 24 is covered by a light transmissive lens 40, commonly a glass plate that spans and seals with the reflector rim 19 to enclose and protect the light source 28. A plate is understood to a two sided walled body, having a substantially greater span than thickness. The lens 40 has a thickness that may be constant (discounting the lenticules) or may smoothly vary as a modest lens. The preferred lens 40 has an axial center and transverse to the axis has the form of a circular disk that is bowed forward in the axial direction toward the field to be illuminated. Alternatively, the lens 40 may be flat, or alternatively smoothly curved (circular, parabolic, hyperbolic, elliptical etc.) in the axial direction, and transverse to the axis the lens 40 may have the form of a hexagon, a regular polygon, rectangle or similarly convenient shape for mounting on the open end of a shell shaped reflector.

The PAR lamp lens 40 has plurality of lenticules 42 arranged in pattern on either the interior or the exterior surface of the lens 40. The lenticules 42 are arranged in a pattern sufficiently broad as to substantially intercept the majority of the light emitted by the light source and directed either directly forward from the light source 28 or reflected forward by the reflective surface 16. The lenticule pattern is configured as described below to avoid the beam distortion and light striations associated with previously used patterns.

Figure 3:
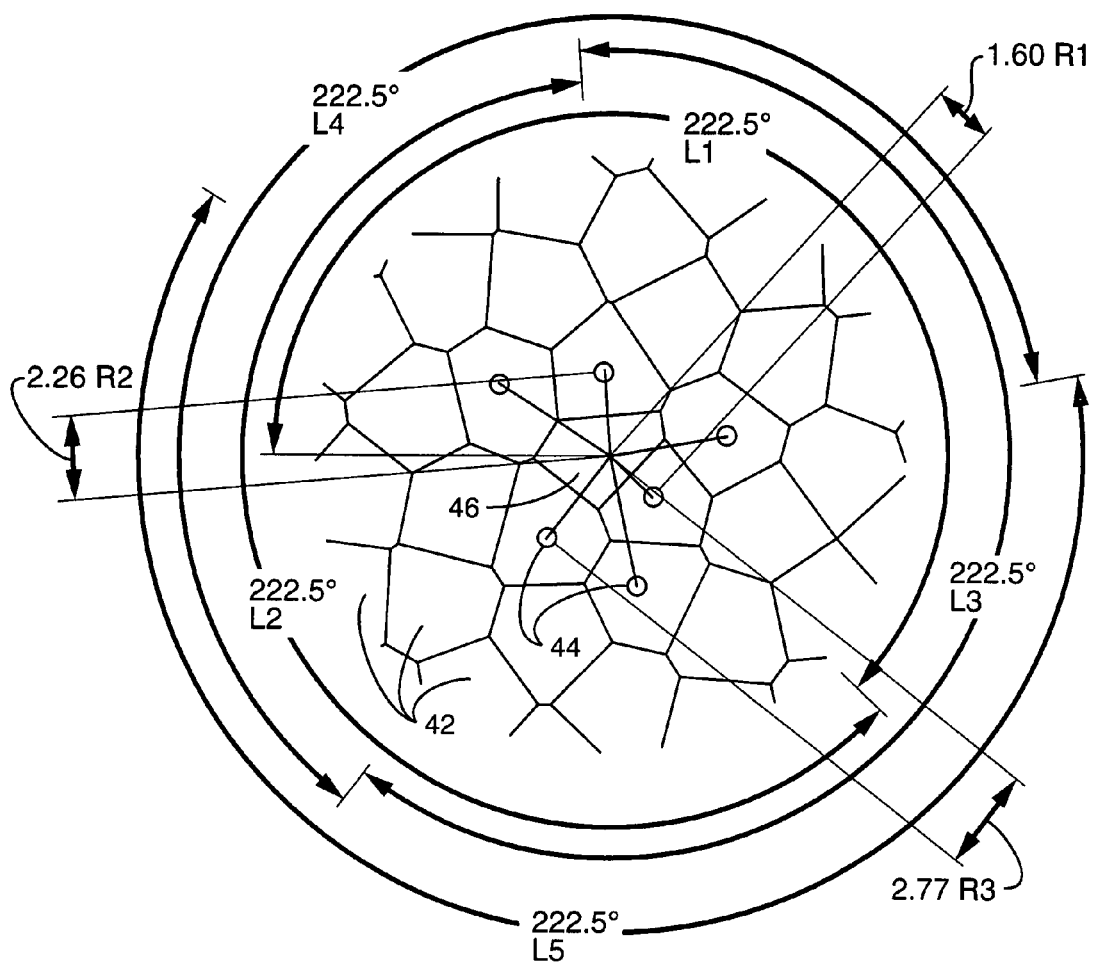
FIG. 3 shows detailed central section of a preferred embodiment of a lamp lens with a lenticule pattern based on the golden ratio.

FIG. 3 shows detailed section of an end view of a preferred embodiment of a lens 40 with a lenticule pattern based on golden ratio. The interior optical surface of the lens 40 is covered with spherically domed optical lenticules 42 whose centers 44 have an arrangement defined by a mathematical rule. Lenticules are formed on the lens 40 surface essentially as a plurality of small, closely packed, domed lenses. In general the lenticules 42 are arranged in a spiral pattern wrapping in one spiral direction around a center lenticule 46. The size and number of lenticules may vary, but mold cost, glass quality, and other practical aspects of mold cutting and of glass molding influence the final choice. The preferred embodiment is to select a lenticule size (diameter, height) that is as small as practical given the cost of cutting a mold, and the difficulty of accurately filling small lenticule cavities in pressing molten glass. For a number n of lenticules spiraling sequentially around an initial center lenticule 46, the polar coordinate ($R_n$, $\theta_n$) location of the center of the n'th lenticule counting from 1 along the spiral are defined by the following equations:

$R_n = s * \phi * \sqrt{n}$ where $R_n$ is the radial distance from lens axis, that is a center point within the boundary of the center lenticule;

$\theta_n = n * \phi * 2 * \pi$ where $\theta_n$ is the angular rotation in radians around the center point measured from a chosen starting point.

Where:
n=the number of the lenticule
s=the radial spacing parameter, a rate of radial advance.
$\phi = 2/(1+\sqrt{5}) = 0.618033989\ldots$, also known as phi, or the conjugate of the golden ratio=$\Phi-1$ The spiral pattern uses phi to set the radial and angular coordinates of the centers of successive lenticules. The pattern maximizes lenticule packing density, while assuring uniformity of lenticule spacing, and avoiding any rotational symmetry due to repetitive harmonics. Elimination of rotational symmetry leads to the even bean pattern free of striations in both the beam center and the beam periphery. With the Golden Ratio pattern, every lenticule has a different distance from the lens axis. As with conventional hexagonal pattern lenses, the amount of beam spread is determined by lenticule radius and spacing of lenticules. The constant phi is unique and must be held to a tight tolerance to properly maintain the lenticule distribution.

Figure 4:
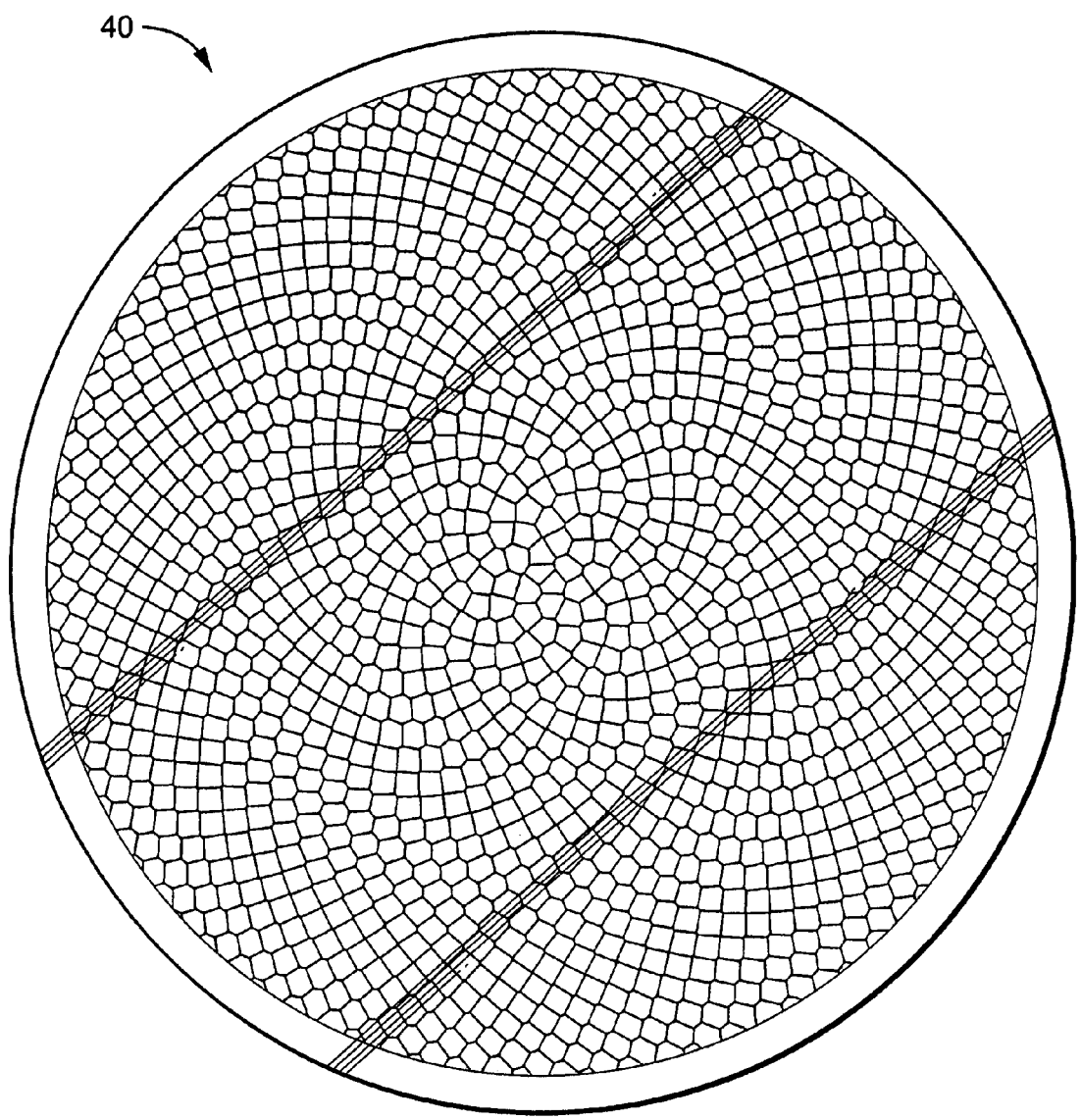
FIG. 4 shows an end view of a preferred embodiment of a lamp with lens lenticule pattern based on golden ratio.

FIG. 3 shows detailed section of an end view of a preferred embodiment of a lamp with lens lenticule pattern based on golden ratio. FIG. 4 shows an end view of a preferred embodiment of a lamp with lens lenticule pattern based on golden ratio. The preferred lens 40 is made out of molded light transmissive glass although plastic may be used. The lens 40 has the general form of a disk, or dish with a diameter matched to the reflector opening 24. The lens 40 has many lenticules 42 arrayed along a single spiral originating at the lens center 46 and defined in polar coordinates by $R_n = s * \phi * \sqrt{n}$ and $\theta_n = n * \phi * 2 * \pi$ where Rn is the radial distance from lens axis and $\theta$n is the angular rotation from the starting point in radians around the center. The parameter s determines the spacing between lenticules and $\phi$ (phi) is commonly known as the golden mean conjugate and is equal to $2/(1+\sqrt{5})$ or approximately 0.618034. The small circles in FIG. 3 indicate the center points for the first 6 lenticules spiraling around the central lenticule 46. The spacing factor in FIG. 3 is 2.59 mm and lenticule radius is 10 mm. Marked in FIG. 3 for lenticule centers 1-3 are the radial offsets ($R_1$=1.60, $R_2$=2.26, $R_3$=2.77), and for lenticule centers 1-5 are the angular increases in the rotations (L1=222.5, L2=222.5, L3=222.5, L4=222.5, L5=222.5).

The Applicant used computer ray tracing software to model the performance of a PAR38 spot lens with the spiral lenticule pattern as described in U.S. Pat. No. 6,086,227. The Applicant's ray tracing produced striation patterns that were in agreement with the striation patterns actually seen in the lamps modeled. Using the same ray tracing software to model a lens with similar beam angle, but now using the golden ratio positioned lenticule pattern, the Applicant found no detectable striations in the model. The modeling also showed a more uniform and circular beam for the golden ratio lenticule pattern, and less variation in beam angle. The golden ratio spaced lenticule pattern is therefore expected to improve beam patterns in both flood lamps and spot lamps.

The simplicity of the golden ratio spacing design makes tooling easy to specify and programming of the milling machine with less chance for error. Additional control of beam shape is possible by varying the spacing factor (s) depending on lenticule number or radial distance from the lamp axis to provide more or less spread near the outer edge of the lens. The radial spacing can be varied without changing the overall pattern. The lenticules can also vary in radius depending on the distance from the axis and can have axial profiles other than spherical. Elliptically and parabolically domed lenticules are possible. The center lenticule 46 was found to have little effect on over all beam spread so the first few (central most) lenticules can be omitted to leave a clear or stippled region in the center of the lens. The center region may then be used for descriptive lettering, logo, or other marking.

The golden ratio spacing pattern of the lenticules provides a very smooth and round beam of light without the striations caused by other lenticule patterns and allows the use of lenticule optics on spot lenses to achieve improved center beam intensity. The relatively uniform lenticule spacing provides a good light cutoff with high center beam intensity for a given beam angle. Beam angle can be varied over a wide range by proper selection of spacing parameter and lenticule radius. The beam distribution shape can be altered by adding a positive or negative growth factor G to spacing parameter s so that $s'=s*(1+G*n)$ (for example where $G=0.001$ so that the spacing factor s' from the n−1'th to the n'th center is $s'=s*(1+0.001*n)$). The new lenticule pattern can fill any lens size by varying the number of lenticules and spacing parameter.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A lamp lens comprising:
a light transmissive plate having a plurality of light refractive lenticules, formed on a surface of the lens, the lens having a center around which the lenticules are positioned and which may be sequentially counted from 1, such that the polar coordinates $(R_n, \theta_n)$ of the n'th sequential lenticule center are defined by the relations:

$R_n=s*\phi*\sqrt{n}$ where $R_n$ is the radial distance from the lens center to the n'th lenticule center; and $\theta_n=n*\phi*2*\pi$ where $\theta_n$ is the angular rotation in radians around the lens center from a chosen position; and Where:
n=the number of the n'th successive lenticule;
s=a radial spacing parameter; and
$\phi=2/(1+\sqrt{5})$ (=0.618033989 . . . ).

2. A lamp lens comprising:
a light transmissive plate having a plurality of light refractive lenticules, formed on a surface of the lens, the lens having a center around which the lenticules are positioned and which may be sequentially counted from 1, such that the polar coordinates $(R_n, \theta_n)$ of the n'th sequential lenticule center are defined by the relations:

$R_n=s*(1+G*n)*\phi*\sqrt{n}$ where $R_n$ is the radial distance from the lens center to the n'th lenticule center; and $\theta_n=n*\phi*2*\pi$ where $\theta_n$ is the angular rotation in radians around the lens center from a chosen position; and Where:
G=a growth factor
n=the number of the n'th successive lenticule;
s=a radial spacing parameter; and
$\phi=2/(1+\sqrt{5})$ (=0.618033989 . . . ).

3. A reflector lamp comprising:
a reflector having a wall defining a cavity with a reflective surface and an opening facing a field to be illuminated;
a light source positioned in the cavity;
a base mechanically coupled to the reflector and providing electrical connection to the light source;
a light transmissive lens in the form of a plate spanning and mechanically closing the reflector opening, and the lens having a plurality of light refractive lenticules, formed on a surface of the lens, the lens having a center around which the lenticules are positioned and which may be sequentially counted from 1, such that the polar coordinates $(R_n, \theta_n)$ of the n'th sequential lenticule center are defined by the relations:

$R_n=s*\phi*\sqrt{n}$ where $R_n$ is the radial distance from the lens center to the n'th lenticule center; and $\theta_n=n*\phi*2*\pi$ where $\theta_n$ is the angular rotation in radians around the lens center from a chosen position; and Where:
n=the number of the n'th successive lenticule;
s=a radial spacing parameter; and
$\phi=2/(1+\sqrt{5})$ (=0.618033989 . . . ).

4. A reflector lamp comprising:
a reflector having a wall defining a cavity with a reflective surface and an opening facing a field to be illuminated;
a light source positioned in the cavity;
a base mechanically coupled to the reflector and providing electrical connection to the light source;
a light transmissive lens in the form of a plate spanning and mechanically closing the reflector opening, and the lens having a plurality of light refractive lenticules, formed on a surface of the lens, the lens having a center around which the lenticules are positioned and which may be sequentially counted from 1, such that the polar coordinates $(R_n, \theta_n)$ of the n'th sequential lenticule center are defined by the relations:

$R_n=s*(1+G*n)*\phi*\sqrt{n}$ where $R_n$ is the radial distance from the lens center to the n'th lenticule center; and $\theta_n=n*\phi*2*\pi$ where $\theta_n$ is the angular rotation in radians around the lens center from a chosen position; and Where:
G=a growth factor
n=the number of the n'th successive lenticule;
s=a radial spacing parameter; and
$\phi=2/(1+\sqrt{5})$ (=0.618033989 . . . ).

* * * * *